United States Patent
Lövsén

(10) Patent No.: US 6,975,263 B1
(45) Date of Patent: Dec. 13, 2005

(54) DEVICE FOR POSITION DETERMINATION BY MEANS OF RADIO WAVES

(75) Inventor: Håkan Lövsén, Linköping (SE)

(73) Assignee: Combitech Traffic Systems AB, Jönköping (SE)

(*) Notice: Subject to any disclaimer, the term of this patent is extended or adjusted under 35 U.S.C. 154(b) by 0 days.

(21) Appl. No.: 09/700,926

(22) PCT Filed: May 31, 1999

(86) PCT No.: PCT/SE99/00936

§ 371 (c)(1),
(2), (4) Date: Nov. 21, 2000

(87) PCT Pub. No.: WO99/67655

PCT Pub. Date: Dec. 29, 1999

(30) Foreign Application Priority Data

Jun. 24, 1998 (SE) .................... 9802234

(51) Int. Cl.$^7$ .......................... G01S 13/00; H01Q 21/00
(52) U.S. Cl. .............................. 342/70; 342/71; 342/72; 343/844
(58) Field of Search .................. 342/70–72, 90, 342/104, 118, 359, 367–377; 343/711, 844, 343/725, 776; 340/988, 425.5, 435

(56) References Cited

U.S. PATENT DOCUMENTS 4,151,525 A * 4/1979 Strauch et al. ............ 342/46
5,166,690 A * 11/1992 Carlson et al. ............ 342/157
5,245,348 A * 9/1993 Nishikawa et al. ........ 342/359
5,270,724 A * 12/1993 Ajioka ...................... 343/725
5,546,095 A 8/1996 Lopez
5,751,227 A * 5/1998 Yoshida et al. ............ 340/928
5,784,022 A * 7/1998 Kupfer ....................... 342/80

FOREIGN PATENT DOCUMENTS

| DE | 26 45 058 A | 4/1978 |
| SE | B442348 | 12/1985 |
| WO | A1-8600716 | 1/1986 |
| WO | A1-9219021 | 10/1992 |

* cited by examiner

Primary Examiner—Thomas H. Tarcza
Assistant Examiner—Isam Alsomiri
(74) Attorney, Agent, or Firm—Birch, Stewart, Kolasch & Birch, LLP

(57) ABSTRACT

A device for determining the position of a vehicle on a roadway by using radio waves which are emitted from the device and reflected by the vehicle and received by at least two array antennas (1, 2) arranged across the roadway, wherein the array antennas (1, 2) comprise a number of antenna elements (5–14), one of the antenna elements in the respective array antenna constituting the phase center (5, 10) of the array antennas, and wherein the antenna elements (5–14) of the array antennas are connected to one another such that the distance (d) between the phase centers (5, 10) of the array antennas (1, 2) included is smaller than half the width of an individual array antenna (1, 2).

7 Claims, 2 Drawing Sheets

DEVICE FOR POSITION DETERMINATION BY MEANS OF RADIO WAVES

This application is the national phase under 35 U.S.C. § 371 of PCT International Application No. PCT/SE99/00936 which has an International filing date of May 31, 1999, which designated the United States of America.

TECHNICAL FIELD

The invention relates to a device for position determination by means of radio waves, preferably microwaves. In particular, it relates to successive position determination of vehicles on a roadway.

BACKGROUND ART

In a method for position determination by means of radio waves, so-called measuring in, a radio signal is emitted, preferably within the microwave range, where the signal has good directivity and the property of being reflected from objects, or, alternatively, of being reemitted with a device intended therefor. The reflected signal is received with two antennas, which are arranged so as to be at a distance from each other in a plane substantially perpendicular to the direction to the object. By the distance between the antennas, a wave reflected by the object will have a longer distance of travel to one of the antennas than to the other. This difference in the distance covered gives rise to a phase difference between the received signals. From the phase difference, a reference angle to the object in relation to the antennas may be calculated in a plane which is formed by antennas and object. Such a method is described, for example, in Swedish patent application No. 8403564-1. In this way, each position of the object corresponds to a certain phase difference.

The method is shown geometrically in FIG. 1. The antennas 1 and 2 are placed at a distance d from each other. The object 3, or usually a so-called transponder on this object, the position of which is to be determined, reflects the emitted wave in a direction towards the antennas 1 and 2. Because the antennas are spaced at the distance d from each other, a difference $\Delta L$ in the distance covered arises. The difference $\Delta L$ gives rise to a phase difference $\Delta\phi=\phi_1-\phi_2$, where $\phi_1$ and $\phi_2$ are the phase angle for the signal received at the antennas 1 and 2, respectively. From this phase difference $\Delta\phi$, the geometrical angle $\theta$ may be calculated, sin $\theta \propto \Delta L \propto \Delta\phi$.

The angle $\theta$ is thus periodically dependent on the phase difference $\Delta\phi$, as is clear from FIG. 2. This means that there is an interval outside of which the angle $\theta$ is no longer unambiguous but may correspond to more than one position. This interval is inversely dependent on the distance d, that is, the interval increases when d decreases. Thus, from this point of view, it is desired to have as small a distance d as possible to achieve a large unambiguous region for the angle $\theta$.

To achieve good directivity in an antenna, it is composed of a plurality of antenna elements to form so-called array antennas. Such an arrangement, of course, gives the antennas a certain physical extent and thus limits the distance d downward. The distance d in FIG. 1 relates, for a pair of array antennas, to the distance between the respective antenna centers.

Hence, the requirement for good directivity conflicts with the requirement for a large unambiguous region. The invention suggests a device for satisfying the requirement for good directivity while at the same time maintaining the requirement for a large unambiguous region.

SUMMARY OF THE INVENTION

The invention is directed towards achieving a small distance between the centers of at least two array antennas while still allowing a large extent for the respective array antenna in order to permit both good directivity and a large unambiguous region. This is achieved according to the aspect of the invention by interweaving antenna elements of the array antennas with one another in such a way that the antenna centers for the array antennas are at a small mutual distance. This is achieved according to the invention by connecting the various antenna elements in the array antennas such that the central antenna elements in the respective array antenna are arranged close to one another.

BRIEF DESCRIPTION OF THE DRAWINGS

FIG. 1 is a schematic picture of a principle of measurement in which the phase difference between two signals received in antennas are analyzed for position determination of an object by angular measurement with the antennas placed at a definite distance from one another, FIG. 2 illustrates the geometrical angular deviation for the object as a function of the phase difference.

DESCRIPTION OF EMBODIMENTS

Figure 1:
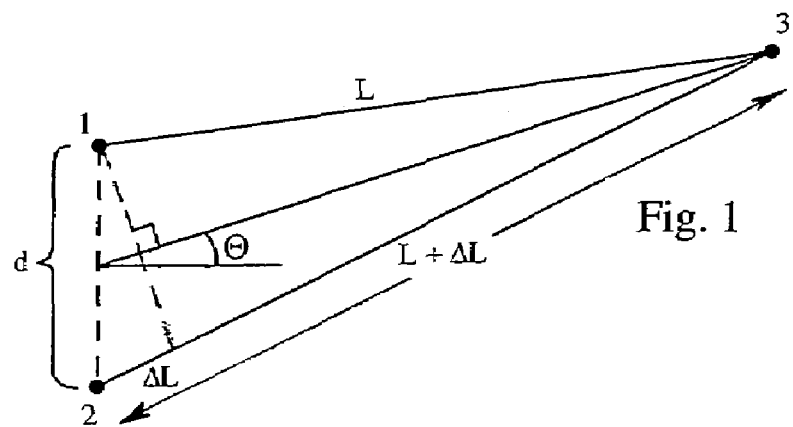
FIGS. 1 and 2 relate to the basic principles of the invention and are described above as prior art, whereas FIGS. 3, 4 and 5 relate to one aspect of the invention.
Figure 2:
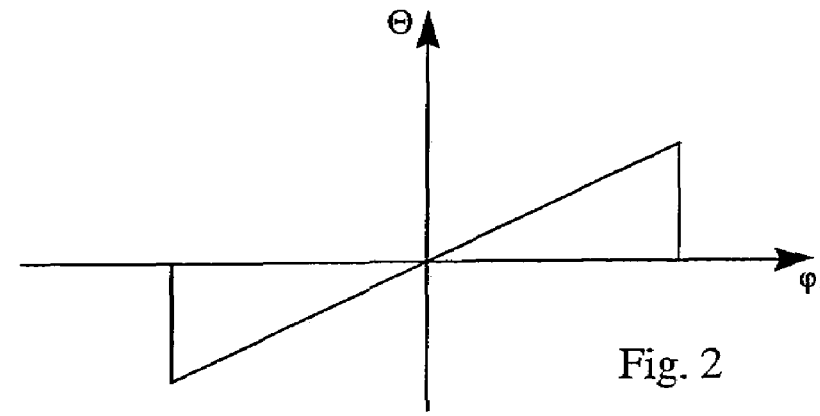
Figure 3:
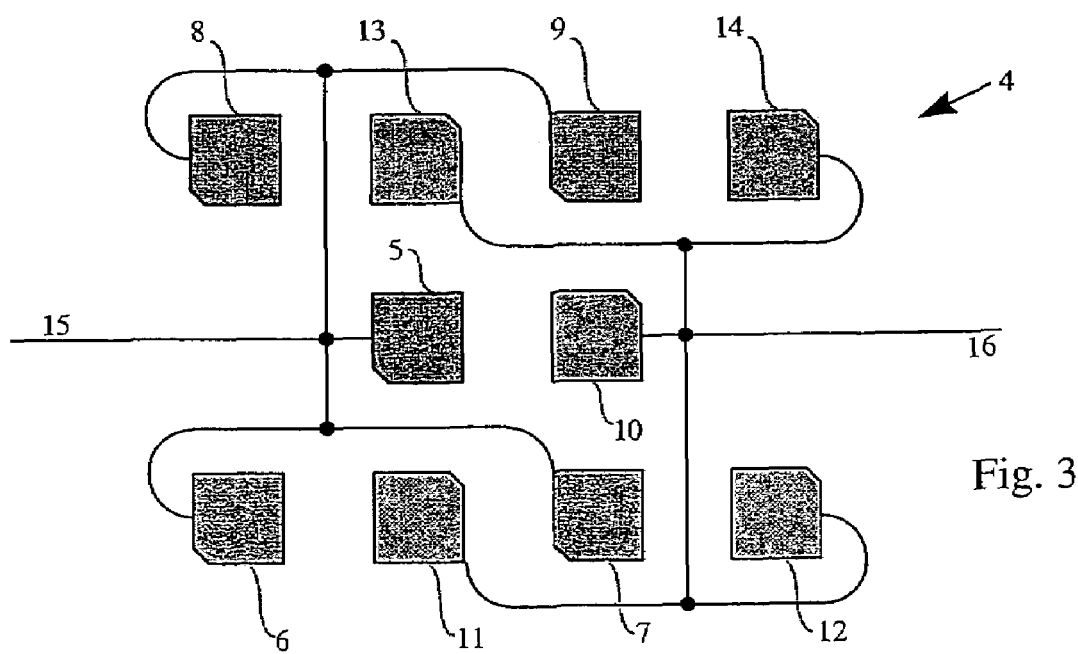
FIG. 3 shows an antenna arrangement according to the invention in a frontal view.
Figure 5:
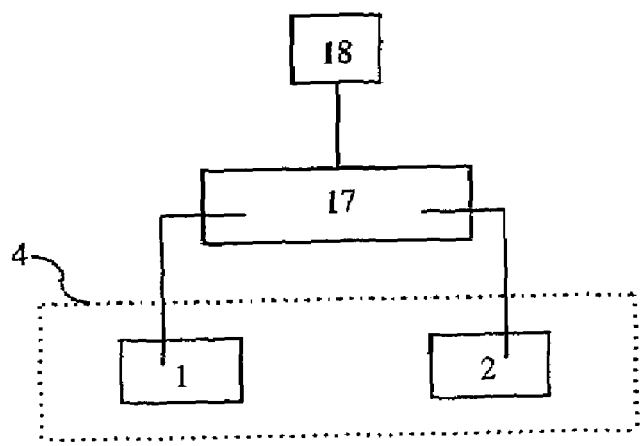
FIG. 5 shows a block diagram for a device for measuring in, which utilizes an antenna arrangement according to the aspect of the invention.

FIG. 5 shows a device for position determination of an object which travels along a path. The device comprises an amplification and signal-processing unit 17 connected to a signal processor 18 and an antenna arrangement 4 with two array antennas 1 and 2, the array antennas being arranged along a first axis perpendicular to the direction of travel of the object. The antenna arrangement comprises two arrays of conducting surfaces, antenna elements, according to FIG. 3. The array antenna 1 is formed of the five surfaces, antenna elements, 5–9 in such a way that the antenna elements 6–9 are placed peripherally around the central antenna element 5. In the same way, array antenna 2 is formed of the central antenna element 10 and the peripheral antenna elements 11–14. Through the output conductors 15 and 16, the antenna elements within the respective array are joined together to form the two array antennas 1 and 2. By means of the arrangement described, symmetrically arranged around the central antenna elements 5 and 10, respectively, these central surfaces, in the form of antenna elements, form the phase center of the respective array antenna. The distance between these two phase centers thus constitutes the distance d in FIG. 1.

The width of the antenna 1 extends from the lefthand edge of the antenna elements 6 and 8 to the righthand edge of the antenna elements 7 and 9. The width of the antenna 2 extends from the lefthand edge of the antenna elements 11 and 13 to the righthand edge of the antenna elements 12 and 14. If the antennas were placed side by side, this would mean that the distance d between the respective phase centers 5 and 10 would become at least as large as the total width of an array antenna, and in practice more since there has to be a certain distance between the outermost antenna elements in the respective array antenna 1, 2. As is clear from FIG. 3, however, the distance between the phase centers is considerably smaller, which thus is achieved by interconnecting the various antenna elements, in this embodiment by allowing the array antennas to be interwoven with one another.

The principle described may be utilized also in more complicated antenna arrangements. Thus, angle measurement may be refined by placing more than two antennas in such an arrangement, that is, with the antennas arranged along the first axis. The accuracy of measurement is, of course, improved if it is possible to form the mean value over a large number of measurement results.

Another advantage of using more than two array antennas aligned on the same axis is given by the following. If the distance d between the centers of two array antennas increases, this implies that the distance ΔL increases for each angle θ. If the distance ΔL is increased, this implies an increased phase difference Δφ for each change of angle, that is, the resolution is improved. Again, this comes into conflict with the requirement for unambiguity. By arranging a plurality of array antennas in a row on the same axis, for example, three antennas designated A, B and C in the mentioned order, the described conflict may be solved. By using the measured phase difference from data obtained from antennas A and B for the unambiguity and the measured phase difference between antennas A and C for obtaining an improved resolution, both requirements may be satisfied.

It is also possible to arrange antennas along several axes and hence permit measuring in at several planes. By placing at least one additional pair of array antennas along an axis substantially perpendicular to the first axis and substantially perpendicular to the direction of travel of the object, a reference angle to the object in relation to the antennas may thus be determined in each of the two planes, substantially perpendicular to each other, which are formed by the object and the respective axis on which pairs of antennas are arranged. If, as an example, the object consists of a vehicle travelling on a roadway, where array antennas are arranged along a horizontal first axis at such a height above the roadway that vehicles may pass under the antennas, a substantially horizontal first plane is defined by the antennas 1, 2 and the vehicle 3. In this horizontal plane, an azimuth angle θ to the vehicle may be determined, as described, by determining the phase angle φ. By arranging array antennas along a second axis, which is perpendicular to the first axis and substantially perpendicular to the roadway, it is made correspondingly possible to determine an angle of elevation to the vehicle, where the angle of elevation refers to the vertical second axis. With knowledge of both the azimuth angle and the angle of elevation, as viewed from the two arrays of antennas, the position of the vehicle in relation to the antennas is determined from these angles.

Figure 4:
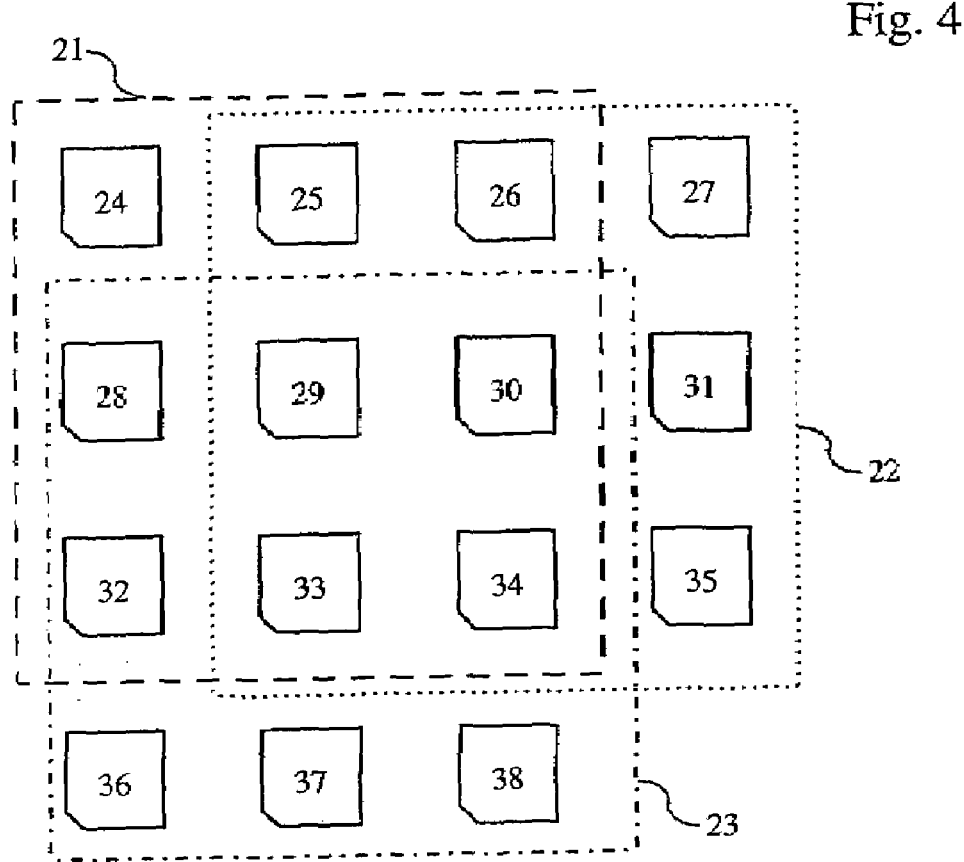
FIG. 4 shows an alternative antenna arrangement according to the invention.

An alternative embodiment with connection, according to the invention, between the different part surfaces arises by arranging certain antenna elements so as to be included in two or more array antennas. The embodiment is described schematically in FIG. 4 for the case of measuring in in two dimensions. In this case, the antenna 20 comprises at least three array antennas. The array antenna 21 consists of the antenna elements 24–26, 28–30 and 32–34, where 29 constitutes the phase center. The array antenna 22 consists of the antenna elements 25–27, 29–31, and 33–35, with 30 being the phase center. The array antenna 23 consists of the antenna elements 28–30, 32–34 and 36–38, with 33 being the phase center. Thus, several antenna elements are used by more than one array antenna. This is made possible by power amplification of the signals received from at least these antenna elements and thereafter by applying power division to the amplified signal. In this embodiment, the same short distance d is obtained as in the previous embodiment.

What is claimed is:

1. A device for determining a position of a vehicle on a roadway by using radio waves which are emitted from the device and reflected by the vehicle and received by at least two array antennas arranged across the roadway, comprising:

each of the array antennas including a number of antenna elements, one of the antenna elements in the respective array antenna constituting a phase center of the array antennas, and wherein the antenna elements of the array antennas are connected to one another such that a distance between the phase centers of the array antennas included is smaller than half the width of an individual array antenna, and wherein the different phase centers of the respective array antennas are placed at least a close distance to each other.

2. The device according to claim 1, wherein the connection comprises interweaving the array antennas with each other in that the phase center of one array antenna is arranged among the antenna elements of another array antenna.

3. The device according to claim 2, wherein some of the antenna elements are at the same time connected to more than one array antenna.

4. The device according to claim 3, wherein signals obtained from antenna elements which are utilized by more than one array antenna undergo a power amplification, followed by a power division of the amplified signal on the respective array antenna.

5. The device according to any of the preceding claims, wherein an azimuth angle θ to the vehicle is determined from an antenna position where at least one pair of substantially horizontally arranged array antennas is arranged.

6. The device according to claim 5, wherein an angle of elevation to the vehicle is determined from the antenna position where at least one pair of substantially vertically arranged array antennas is arranged.

7. The device according to claim 6, wherein the position of the vehicle in relation to the antennas is determined by means of knowledge of the azimuth angle θ and the angle of elevation.

* * * * *